March 16, 1926.  
G. CARBONARO  
MACARONI CUTTING MACHINE  
Filed April 23, 1925  
1,576,949  
2 Sheets-Sheet 1
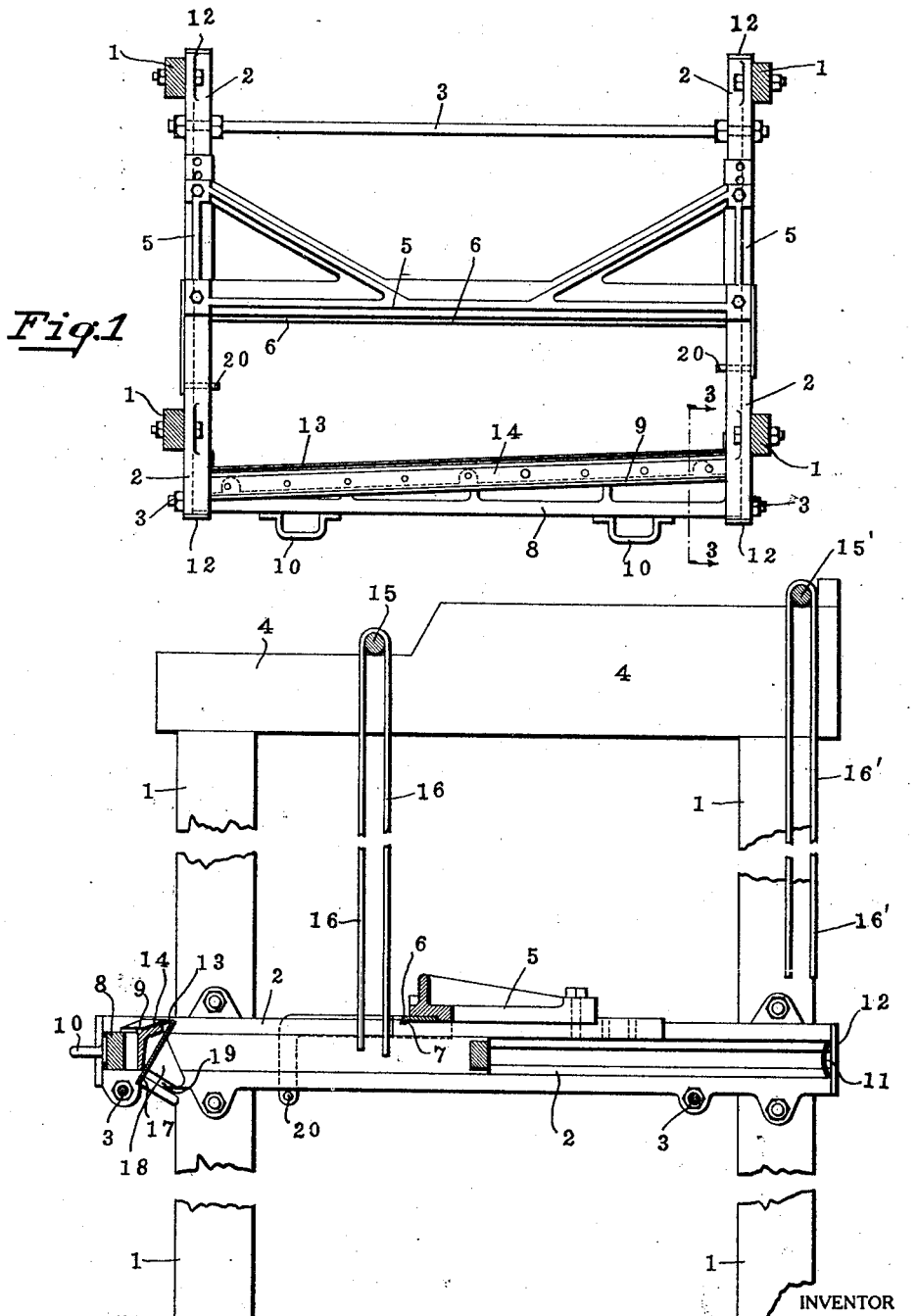
INVENTOR  
Gaetano Carbonaro  
BY  
Mayer, Warfield & Watson  
ATTORNEYS March 16, 1926.  1,576,949
G. CARBONARO
MACARONI CUTTING MACHINE
Filed April 23, 1925   2 Sheets-Sheet 2
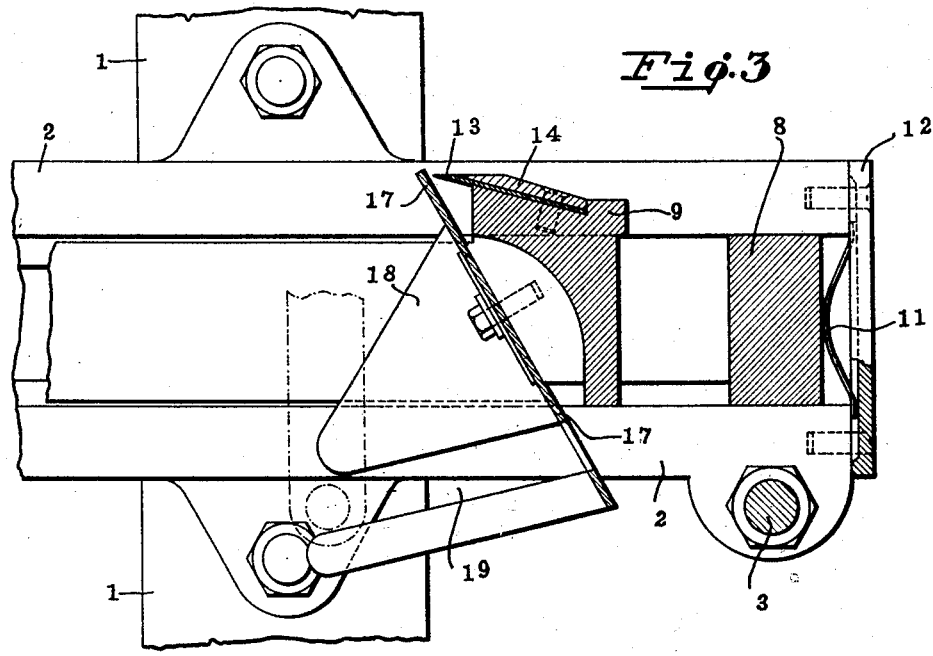
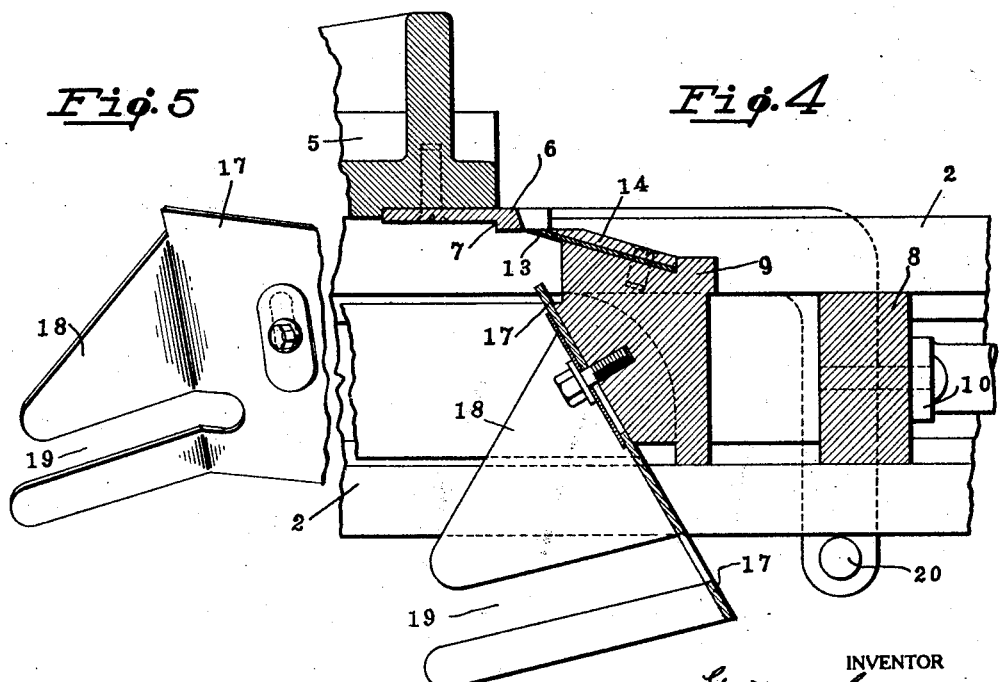
INVENTOR
Gaetano Carbonaro
BY
Mayer Warfield Watson
ATTORNEYS Patented Mar. 16, 1926.

1,576,949

UNITED STATES PATENT OFFICE.

GAETANO CARBONARO, OF BROOKLYN, NEW YORK.

MACARONI-CUTTING MACHINE.

Application filed April 23, 1925. Serial No. 25,398.

*To all whom it may concern:*

Be it known that I, GAETANO CARBONARO, a citizen of the United States, residing in the borough of Brooklyn, in the county of Kings and State of New York, have invented certain new and useful Improvements in Macaroni-Cutting Machines, of which the following is a full, clear, and exact description, such as will enable others skilled in the art to which it appertains to make and use the same.

This invention is a machine for cutting macaroni, spaghetti, vermicelli, or similar articles; but it will hereinafter be described as embodied in a machine for cutting macaroni. Heretofore, in the manufacture of macaroni or the like, a workman places on a stick a number of lengths of the soft macaronis, as they come out of the press; the stick is then supported horizontally, the two ends of the plurality of macaronis hanging down therefrom; then the workman grasps in one hand a bunch of the lower ends of the macaronis, and with a pair of shears in his other hand he snips off the ends of the bunch. This snipping is continued until all the macaronis on the stick are of substantially the same length, after which the stick is left for the macaronis to dry out and harden; and ultimately the dried macaronis are packed in cartons. The effect of the snipping is to compress together the soft lips of the severed ends of the macaronis, whereby moisture is entrapped within these tubular articles; so that the proper drying out of the macaronis, before they are in condition for packing and shipment, is delayed an inordinate length of time. Moreover, the work of manipulating the shears is very fatiguing.

The present invention is a machine by which this work is done easily and with great rapidity and absolute uniformity, without fatiguing the operator and without closing the severed lips of the macaronis. The use of this new machine expedites the manufacture and shipment of the macaroni, and dispenses with much of the exhausting labor heretofore required.

The invention comprises, firstly, the combination of a stationary frame supporting a horizontal cutting-edge, a second frame reciprocable horizontally therein and carrying a complementary cutting-edge, and means for supporting a row of soft macaronis with their ends hanging down between said cutting-edges; secondly, the novel shapes of the two cutting-blades; thirdly, the arrangement of one of the two blades with its cutting-edge at an acute angle to the cutting-edge of the complementary blade; and, fourthly, the provision of an automatic guard for the movable blade. The invention further comprises the various structural features and combinations hereinafter described and claimed.

The invention will be best understood by reference to the accompanying drawings and the ensuing description which disclose, but by way of illustration only, and not as a limitation of the invention, a preferred embodiment of the new machine.

In these drawings, Fig. I is a horizontal section through Fig. II;

Fig. II is a longitudinal vertical section;

Fig. III is a vertical section of a detail, on an enlarged scale, through section line 3—3 of Fig. I showing the relative positions of the reciprocatory knife and its automatic guard while the latter is being retracted;

Fig. IV is a similar view, showing the guard completely retracted; and

Fig. V is a perspective view of one end of said guard and the coacting stud.

Broadly stated the new machine comprises a stationary bed-frame which supports a stationary knife in adjusted position, a frame which reciprocates in said bed-frame and carries a complementary knife and its automatic guard, and means on said bed-frame to support a plurality of macaronis with the ends depending between said knives. More particularly, the bed-frame comprises four upright corner-posts 1; two horizontal side-sills 2, each having a longitudinal channel on its inner face; one or more transverse rods 3, securing together the two sides of the bed frame; and a horizontal upper member 4, one on each side, connecting the tops of the two uprights on that side, the two members 4 serving to support the macaroni-sticks. The support for the stationary knife comprises a transverse member 5, having at each end a yoke fitting and secured in adjusted position upon the adjacent side-sill, as by a bolt and a plurality of holes in the sill. Against a horizontal seat in the underside of said member 5 is secured the stationary knife 6. This is a plate of tool-steel whose front face or edge is bevelled to a sharp cutting-edge, this bevelled face forming with the underface of the knife a dihedral angle of about eighty degrees; while the horizontal lower face of this knife is cut away, as at 7, a short distance behind said cutting-edge. The support for the complementary knife is a frame which consists of a horizontal and transverse rear member 8 and a horizontal front member 9 secured thereto preferably in diagonal position substantially as indicated in Fig. I, so that the knife carried thereby will coact with the stationary knife to produce a shearing effect on the macaronis. At each end of this support 8—9 is a tongue fitting slidably in the aforesaid channel in the adjacent side-sill 2. On the rear face of the transverse member 8 are secured two handles, as 10, by which the operator can reciprocate the movable frame 8—9 and its knife. At each end of each channel is a buffer spring as 11, held by an end-plate as 12 which closes the end of the channel. The reciprocatory knife 13 is a thin strip of tool-steel the upper face of which is bevelled to a sharp cutting-edge, said bevelled face forming with the bottom face of the knife a dihedral angle of about fifteen degrees. This knife is secured against an inclined seat on the upper face of said member 9, as by means of a second plate 14 bolted (through suitable openings in the knife) to said member, the angle of said seat and the location of the knife being such that said bevelled upper face of the knife is substantially horizontal and will pass immediately beneath the horizontal lower face of the stationary knife when the frame is moved forward. 15 is a macaroni-stick supported across the two top members 4, and carrying the soft macaronis 16, whose uncut ends depend between the two cutting-edges. 15' represents another macaroni-stick, from which depend other macaronis 16' that have just been cut and are left to dry.

The cutting-edge of the knife 6 is horizontal, and preferably a straight edge and the one of the two edges which is at right angles to the direction of movement. The cutting-edge of the complementary knife 13 is also horizontal and preferably a straight edge; and preferably it is the edge that is diagonal with respect to the other one, and is the one that moves. And preferably the moving knife passes beneath the stationary knife.

The automatic guard comprises a transverse plate 17, secured against the inclined front face of said diagonal member 9, as by bolts through slots which are elongated in vertical planes to permit said guard to be moved up and down on said inclined face, to cover and uncover the edge of knife 13. At each end of said guard 17 is a forwardly-extending ear 18 provided with a slot 19 open at each end and extending at substantially a right angle to the plane of said plate. From the inner face of a rear projection from each end of the stationary support 5 extends a stud 20, in such position that the slot in the adjacent ear 18 will receive it and pass beyond it. When the operator shoves the frame 8—9 and its knife forwardly, the forward and lower ends of said slots 19 receive the studs 20, and said studs then act upon the lower edge of the slots so as to depress the guard 17, thereby exposing the knife 13 to shear off the ends of the macaronis against the stationary knife 6; and when the operator retracts the reciprocatory frame the rear and upper ends of said slots 19 receive and pass along the studs, and the action of the studs upon the upper side of said slots raises the guard and shields the keen cutting-edge of the knife.

With this machine, particularly when the two knives are respectively shaped and arranged as herein disclosed, the coaction of the knives cleanly and evenly shears-off the ends of the macaronis, without collapsing the lips thereof. Consequently these tubular articles will dry out more rapidly than they have done heretofore with their lips collapsed.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A macaroni-cutting machine which comprises, in combination, a stationary frame which presents adjustably a blade having a horizontal lower face which is cut-away a short distance behind its cutting-edge while its upper face is bevelled off at an angle of approximately eighty degrees to said lower face, a second frame rectilinearly reciprocable in said stationary frame, a complementary blade supported on said movable frame and having its upper face bevelled off into parallelism with the lower face of said stationary blade and located to pass immediately beneath it, the lower face of said movable blade being at an angle of approximately fifteen degrees to its bevelled upper face, a guard-plate mounted reciprocably on said movable frame in front of the last-named blade and having at each end a forwardly-extended ear presenting an open-ended diagonal slot, and two studs mounted on said stationary frame and co-acting with said slots to lower and raise said guard-plate.

2. A macaroni-cutting machine which comprises, in combination, a stationary frame which presents a blade having a horizontal lower face which is cut-away a short distance behind its cutting-edge while its upper face is bevelled-off at an angle of approximately eighty degrees to its said lower face, a second frame reciprocable in said stationary frame, a complementary blade carried by said second frame and having its upper face bevelled-off horizontally while its lower face is at an angle of approximately fifteen degrees to its said bevelled upper face, a reciprocable guard carried in front of said movable blade, and means for automatically moving said guard out of the way as said movable blade approaches said stationary blade, said means restoring said guard as said movable blade recedes.

3. A macaroni-cutting machine which comprises, in combination, a stationary frame which presents a blade having a horizontal lower face which is cut-away a short distance behind its cutting-edge while its upper face is bevelled-off at an angle of approximately eighty degrees to its said lower face, a second frame reciprocable in said stationary frame, and a complementary blade carried by said second frame and having its upper face bevelled-off and horizontal while its lower face is at an angle of approximately fifteen degrees to its said bevelled upper face, the reciprocations of said movable frame carrying said bevelled upper face of its blade immediately beneath and just out of contact with the lower face of said stationary blade.

4. A macaroni-cutting machine which comprises, in combination, a stationary frame presenting a cutting-blade having a horizontal lower face, a second frame reciprocable in said stationary frame and supporting a complementary cutting-blade having a horizontal upper face, said stationary blade presenting a dihedral angle of about eighty degrees and said movable blade presenting one of about fifteen degrees, the reciprocations of said movable frame carrying the upper face of its said blade immediately beneath and just out of contact with the lower face of said stationary frame.

5. A macaroni-cutting machine which comprises, in combination, a stationary frame presenting a cutting-edge, a second frame reciprocable in said stationary frame and carrying a complementary cutting-edge, a guard-plate movable to reciprocate on said movable frame in front of its said cutting-edge, an ear extended forwardly from each end of said plate and having an open-ended diagonal slot, and two studs on said stationary frame coacting respectively with said slots for moving said guard out of the way as said movable edge approaches said stationary edge and for restoring said guard as said movable edge recedes.

6. A macaroni-cutting machine which comprises, in combination, a stationary frame presenting a cutting-edge, a second frame reciprocable in said stationary frame and supporting a complementary cutting-edge, a reciprocable guard in front of said movable edge, and means for automatically moving said guard out of the way as said edge approaches said stationary edge, said means restoring said guard as said movable edge recedes.

7. A macaroni-cutting machine which comprises, in combination, a stationary frame supporting a blade with a continuous and substantially straight cutting-edge whose lower face is horizontal, a second frame horizontally reciprocable in said stationary frame in a direction at right angles to the edge of said stationary blade, a complementary cutting blade supported by said movable frame and presenting a horizontal upper face and having its cutting-edge at an acute horizontal angle to said stationary edge, the reciprocations of said movable frame carrying its said edge immediately below and just out of contact with the lower face of said stationary edge.

8. A macaroni-cutting machine which comprises, in combination, a stationary frame presenting a continuous and substantially straight horizontal cutting-edge, a second frame horizontally reciprocable in said stationary frame, and a complementary horizontal cutting-edge supported by said movable frame, said two cutting-edges occupying substantially the same horizontal plane but being at an acute horizontal angle to each other.

9. A macaroni-cutting machine which comprises, in combination, two coacting blades whose cutting-edges are confined in substantially-adjacent horizontal planes, one of said blades being horizontally reciprocable with respect to the other, and all its positions being parallel, and the lower face of the upper blade and also the upper face of the lower blade being themselves horizontal so that said faces barely clear each other while the movable edge is travelling beyond the other edge.

10. A macaroni-cutting machine having two coacting blades one relatively reciprocable with respect to the other, in which each of the cutting-edges has one face horizontal, said two horizontal faces being respectively confined in substantially adjacent horizontal planes, while the other face of each of said edges is inclined at an angle to the horizontal, one of them at an angle of about fifteen degrees and the other at an angle of not more than eighty degrees.

In testimony whereof I affix my signature.

GAETANO CARBONARO.